United States Patent [19]
Itagaki

[11] Patent Number: 5,553,164
[45] Date of Patent: Sep. 3, 1996

[54] METHOD FOR COMPRESSING AND EXTENDING AN IMAGE BY TRANSFORMING ORTHOGONALLY AND ENCODING THE IMAGE

[75] Inventor: Fumihiko Itagaki, Hokkaido, Japan

[73] Assignee: Canon Kabushiki Kaisha, Tokyo, Japan

[21] Appl. No.: 320,134

[22] Filed: Oct. 7, 1994

Related U.S. Application Data

[63] Continuation of Ser. No. 14,208, Feb. 5, 1993, abandoned.

[30] Foreign Application Priority Data

Feb. 7, 1992 [JP] Japan ..................................... 4-055999

[51] Int. Cl.$^6$ ..................................................... G06K 9/36
[52] U.S. Cl. ............................................................ 382/232
[58] Field of Search ..................................... 358/133, 135, 358/136, 432, 433; 382/279, 232; G06K 9/36, 9/46; H04N 1/04, 1/40, 7/12

[56] References Cited

U.S. PATENT DOCUMENTS

| | | | |
|---|---|---|---|
| 5,150,432 | 9/1992 | Ueno et al. | 382/56 |
| 5,187,755 | 2/1993 | Aragaki | 382/56 |
| 5,212,742 | 5/1993 | Normile et al. | 382/56 |
| 5,267,334 | 11/1993 | Normile et al. | 382/56 |

*Primary Examiner*—Jose L. Couso
*Attorney, Agent, or Firm*—Fitzpatrick, Cella, Harper & Scinto

[57] ABSTRACT

Block distortion standards are obtained by considering the non-linearity of the visual sensation on stimulus, the non-linearity of illumination brightness versus voltage in an image display apparatus, the measurement of errors of lightness which is sensed on brightness stimulus by human beings, the discrimination threshold characteristic on lightness of the visual sensation, and brightness ruggedness. The brightness ruggedness is made proximate by brightness dispersion, so that a calculation cost is lowered.

3 Claims, 1 Drawing Sheet

METHOD FOR COMPRESSING AND EXTENDING AN IMAGE BY TRANSFORMING ORTHOGONALLY AND ENCODING THE IMAGE

This application is a continuation of application Ser. No. 08/014,208 filed Feb. 5, 1993, now abandoned.

FIELD OF THE INVENTION

The invention relates to a method for compressing and extending an image by transforming orthogonally and encoding the image, and more particularly to, and an evaluation method of an image for obtaining an objective standard in regard to block distortion occurring at a block boundary of an image which is transformed orthogonally and encoded.

BACKGROUND OF THE INVENTION

In a conventional facsimile or television-telephone set, transmission data is compressed and encoded so that the data transmission amount is decreased. As a method for compressing image data, an estimate encoding method and a transformation encoding method are utilized conventionally. In the estimate encoding method, a signal to be next supplied is estimated in accordance with a signal which has been known by decoding an encoded signal, so that only a signal component which is different in the estimation from a correct signal is transmitted to decrease the amount of information to be encoded.

In the transformation encoding method, only coefficients of components, signal electric power of which converges on a low frequency region, are encoded to decrease the amount of information, because the signal electric power of image signals having high correlation is distributed mainly on the low frequency region. That is, the correlation of the image signals is positively utilized, so that higher compression effect is obtained in the transformation encoding method than in the estimate encoding method. However, the amount of arithmetic logic processes is larger in the transformation encoding method than in the estimate encoding method, so that the practical use of the transformation encoding method has been delayed as compared to the estimate encoding method.

In accordance with the development of computer technology, however, the calculation of orthogonal transformation required for the transformation encoding method has been easy in these days, so that the transformation encoding method has been widely used in the encoding of images. As an orthogonal transformation to a frequency region, DCT (discrete cosine transformation) is considered to be most effective for practical uses, because DCT is superior in regard to electric power converging on a low frequency region and the process speed of calculation algorithm. Among other orthogonal transformations than DCT, slant transformation, hurl transformation, etc. can be used in encoding images.

According to the conventional image compression method using DCT, however, there is a disadvantage in that an optimum compression factor is difficult to be set therein. That is, when coefficients are coarsely quantized, a data compression factor becomes large to deteriorate the quality of image. In other words, the process of the image compression is carried out with high speed, while block distortion which is discontinuity at boundaries of blocks is generated in reproducing images. On the other hand, when the coefficients are finely quantized, the data compression factor becomes small to decrease the block distortion, while a high speed process is hindered, and the process of pictures having fast motion is difficult to be carried out.

Considering this disadvantage, a higher order portion corresponding to a high frequency region is coarsely quantized, and a lower order portion corresponding to a low frequency region is finely quantized, because an actual image does not include a substantial amount of the high frequency component. Consequently, the highly effective encoding of images is carried out without lowering quality of the images.

It has been reported that block distortion which is one of factors for deteriorating the quality of reproduced images is sensed to be larger than random interference by ten times.

In spite of the above coarse and fine quantization dependent on frequencies, a considerable block distortion occurs visually, in case where an original image includes a large amount of the high frequency component. This is applied to image compression methods using transformation other than DCT.

SUMMARY OF THE INVENTION

Accordingly, it is an object of the invention to provide a method for compressing and extending an image by transforming orthogonally and encoding the image in which the quality of the image is adequately evaluated in regard to block distortion with a low calculation cost, and the visual sensation characteristic of human beings is adequately reflected.

According to the invention, in a method for compressing and extending an image by transforming orthogonally and encoding the image comprising the step of compressing the image by a compression factor determined as a result of an image evaluation of a block having a predetermined number of pixels which is obtained from the division of the image, the method, comprising the steps of:

providing a block distortion standard at a boundary between image blocks; and correcting the compression factor in accordance with the block distortion standard.

BRIEF DESCRIPTION OF THE DRAWINGS

The invention will be described in more detail in conjunction with appended drawings, wherein.

DESCRIPTION OF THE PREFERRED EMBODIMENT

Figure 1:
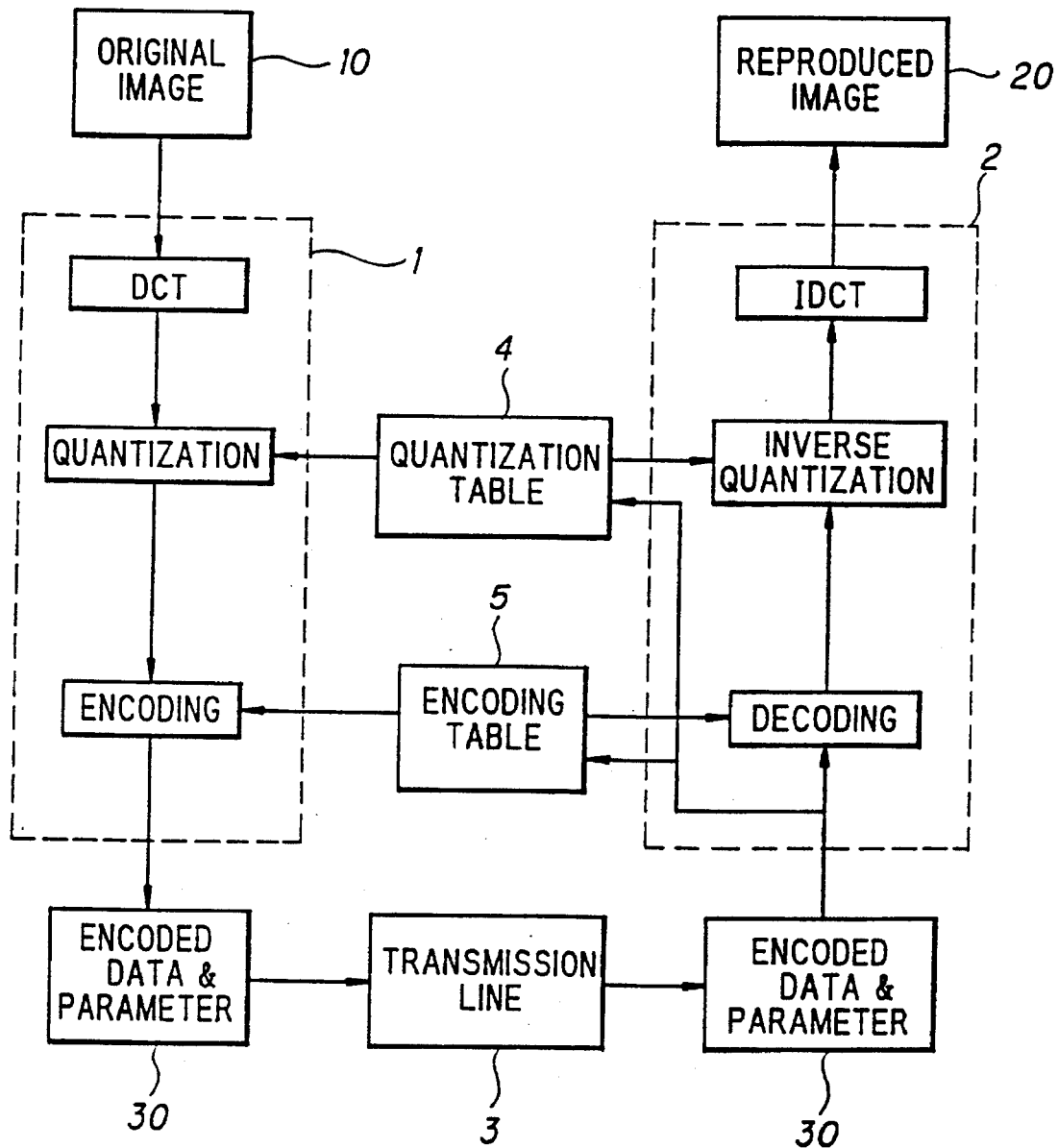
FIG. 1 is a block diagram showing an image compression apparatus using DCT.

The background of the invention will be explained with reference to FIG. 1.

An image data compression apparatus using a standard DCT comprises a transmitter (compression circuit) 1, a receiver (extension circuit) 2, and a transmission line 3, wherein image data 10 which is divided into blocks each having 8×8 pixels (dots) is supplied to the transmitter 1, and reproduced image data 20 is supplied from the receiver 2.

In the transmitter 1, the two dimensions DCT transformation is carried out for each block in accordance with the following transformation equation (1).

$$S_{uv} = \qquad (1)$$

-continued $$\frac{1}{4} C_u C_v \sum_{x=0}^{7} \sum_{y=0}^{7} (P_{xy} - L_s) \cos \frac{(2x+1)u\pi}{16} \cos \frac{(2y+1)v\pi}{16}$$

In the above equation (1), x and y are positions of a pixel, and u and v are positions of a DCT coefficient, wherein Cu and Cv are $$\frac{1}{\sqrt{2}},$$

when u and v are zero, Cu and Cv are 1, when u and v are other values, Ls is 128, when a bit precision for a pixel value Pxy is of 8 bits, and Ls is 2048, when the bit precision is of 12 bits.

As a result of this transformation, 64 coefficients Suv are obtained in each block, among which a coefficient Soo is called DC coefficient indicating a mean value (direct current component) of 64 pixels in a block, while the remaining coefficients are called AC coefficients. In accordance with this transformation, 8×8 pixels of a block are defined by a linear coupling of 64 DCT fundamental vectors.

In this DCT transformation, electric power of ordinary images is distributed mainly on a low frequency region. By using this property, image compression is realized to carry out quantization in which a small number of bits are allocated to coefficients of a low frequency component, and a large number of bits are allocated to coefficients of a high frequency component.

The coefficient Suv is quantized at each coefficient position in a step size different from others by using a quantization table 4. When the quantization is coarsely carried out by decreasing the number of quantization levels, the amount of data can be decreased. In this case, a data compression factor becomes large, while the deterioration can not be avoided in quality of images, if the coarse quantization is made without any consideration. As a result, discontinuity occurs at boundaries of blocks, and error occurs due to the drop of data. Thus, block distortion is increased in the quantization.

On the other hand, when the quantization is finely carried out to result in the decrease of the compression factor, the block distortion is decreased, while the process of motion pictures having a large amount of data is difficult to be carried out. In fact, however, a high frequency component is not included in actual images by a substantial amount. In accordance with this tendency, the coarse quantization is made in the DCT method for higher order coefficients, and the fine quantization is made therein for lower order coefficients. Consequently, the encoding of data can be carried out with a high efficiency, while the quality of images is not lowered.

Practically, the decision of a compression factor is made in accordance with the selection of an appropriate compression factor from plural compression factors by an operator. For this purpose, quantization tables corresponding to plural compression factors are accessed in a compression circuit to quantize coefficients of the transformation equation (1). At this time, almost all of the high frequency component is deleted.

The quantized coefficients are encoded in accordance with entropy encoding by using an encoding table 5. For this purpose, Hoffman encoding method is often used. Then, encoded data is transmitted from the transmitter 1 via the transmission line 3 to the receiver 2 together with a parameter including information as to which table is used.

In the receiver 2, the encoded data is decoded to provide the quantized data by referring to the transmitted encoding table 5. The quantized data is inversely quantized to provide the DCT coefficients by referring to the transmitted quantization table 4. In accordance with the property of the quantization, completely original DCT coefficients are not restored. In this sense, the DCT method is defined as a non-invertible encoding method. Then, the DCT coefficients are inversely transformed to the reproduced image data 20 of blocks each having 8×8 pixels.

As described above, the original image data 10 is processed in the transmitter 1 to be the compression data 30 in accordance with the orthogonal transformation, the quantization and the variable length encoding, and the compression data 30 is extended in the receiver 2 to provide the reproduced image data 20 in accordance with the decoding, the inverse quantization and the inverse orthogonal transformation.

Next, a method for compressing and extending an image by transforming orthogonally and encoding the image of a preferred embodiment according to the invention, in which the evaluation of the image is carried out in the apparatus shown in FIG. 1 in accordance with the following steps.

(1) Considering the Non-Linearity of Visual Sensation on a Stimulus

The characteristic of the visual sensation on the stimulus of brightness is not linear. In order to measure an error in accordance with the sense of human beings (not dependent on the level of brightness), it is necessary to convert the level of brightness to a level proportional to the visual sensation characteristic of human beings. In general, the visual sensation characteristic is approximately represented by the rules of Weber, Fechner and Stevens. According to the rule of Stevens, a brightness E for human beings to sense a stimulus I of brightness is represented by the following equation (2).

$$E = \alpha I^\beta \qquad (2)$$

where $\alpha$ and $\beta$ are constants, and $\beta$ ranges 0.3 to 0.5.

(2) Considering the Non-Linearity of an Image Display Apparatus

In general, images are displayed on a display apparatus such as CRT, etc. Therefore, the characteristic of the display apparatus is necessary to be considered. An image on the display apparatus becomes bright dependent on a voltage applied to electrodes thereof. A relation of the voltage V of the electrodes and an illumination brightness is represented by the following equation (3).

$$I = cV^\gamma \qquad (3)$$

where c and $\gamma$ are constants.

In accordance with the equation (3), the equation (4) is obtained.

$$V_k = \left( \frac{I_k}{c} \right)^{\frac{1}{\gamma}} \qquad (4)$$

where Vk and Ik are values for V and I, respectively. This is referred to as $\gamma$ correction.

A value of $\gamma$ is 2.2 to 2.8 for general CRT display apparatus. In order to reproduce relative brightness of original images on a CRT display apparatus, the $\gamma$ correction is necessary to be applied to brightness signals proportional to brightness of the original images. In this preferred embodiment, image signals which are processed in advance by the $\gamma$ correction are used.

(3) Measuring an Error of Lightness

"Lightness" is defined by a sense amount on a brightness stimulus of human beings. An error e(m, n) of a pixel(m, n) of a reproduced image relative to a pixel (m, n) of an original image is defined by the following equation (5).

$$e(m,n)=E(Y(m,n))-E(X(m,n)) \quad (5)$$

where m is a horizontal address of a pixel and the first pixel on the left side is represented by (m=0), and n is a vertical address of the pixel and the first pixel on the upper side is represented by (n=0). A pixel on the right side of the pixel (m, n) is represented by (m+1, n) and a pixel on the lower side is represented by (m, n+1). X(m, n) is a brightness signal level of a pixel (m, n) of an original image, and Y(m, n) is a brightness signal level of a pixel (m, n) of a reproduced image.

In the equation(5), E(v) is a conversion function for converting a brightness signal level V of an image to a blightness. Image signals to be processed are applied in advance with the γ correction relative to an illumination brightness by the equation(3), so that an actual brightness is necessary to be sought by applying the conversion (inverse γ correction) of the equation(3) to the image signal level V. Further, the conversion of the equation(2) is necessary to be carried out to obtain a relative lightness which is sensed to this illumination brightness by human beings.

Accordingly, E(v) is obtained from the equations(2) and (3) as represented by the following equation(6).

$$E(V)=\alpha \, c^\beta V^{\gamma\beta} \quad (6)$$

As described before, if β is 0.3 to 0.5 and γ is 2.2 to 2.8, γβ is 0.66 to 1.4. By assuming this value to be "1", the equation(5) is replaced by the following equation(7), because E(v) is proportional to V.

$$e(m,n)=Y(m,n)-X(m,n) \quad (7)$$

(4) Defining an error in consideration of the discrimination threshold characteristic relative to a lightness of the visual sensation.

The visual sensation of human beings keeps the discrimination threshold characteristic relative to a lightness, and an error less than a threshold value is not sensed. This is necessary to be considered to measure an objective error amount. An error e'(m, n) in consideration of a discrimination threshold relative to a lightness of the visual sensation is defined by the following equation (8).

$$e'(m,n)=t\,e(m,n) \quad (8)$$

where the coefficient t is "1" (t=1), when an error e(m, n) of a lightness of a pixel of a reproduced image relative to a lightness of a pixel of an original image is greater than Kth[e(m, n)≦Kth], and the coefficient t is 0(t=0), when the error e(m, n) is equal to or less than Kth[e(m, n)<Kth]. Here, Kth is a discrimination threshold value of human beings relative to a lightness.

(5) Defining a Standard of Block Distortion

When the variation of errors between the original image and the reproduced image is continuous before and after a boundary of blocks, no block distortion occurs, even if an absolute value of the errors is large. In other wards, block distortion occurs, when the errors are discontinuous at the boundary.

The error variation amount dh(m, n) between horizontal adjacent pixels (m, n) and (m-1, n) in an image, and the error variation amount dr(m, n) between vertical adjacent pixels (m, n) and (m, n-1) in the image are defined by the following equations (qa) and (qb).

$$dh(m,n)=e'(m,n)-e'(m-1,n) \quad (9a)$$

$$(m \geq 1, n \geq 0)$$

$$d_v(m,n)=e'(m,n)-e'(m,n-1) \quad (9b)$$

$$(m \geq 0, n \geq 1)$$

A standard of block distortion at block boundaries is obtained in self-multiplication of the error variation amount at each block boundary and in an average of the self-multiplication values by a side length of the blocks. That is, a block distortion standard qh(k, l) at a boundary of blocks(k, l) and (k-1, l) and a blocks distortion standard qv(k, l) at a boundary of blocks (k, l) and (k, l-1) are defined by the following equations(10a) and (10b).

$$q_{h(k,l)} = \frac{\sum_{i=0}^{N-1} [d_h(M_k, N_{l+i})]^2}{N} \quad (10a)$$

$$(k \geq 1, l \geq 0)$$

$$q_{v(k,l)} = \frac{\sum_{i=0}^{M-1} [d_v(M_{k+i}, N_l)]^2}{M} \quad (10b)$$

$$(k \geq 0, l \geq 1)$$

where k is a horizontal address of a block, and the first block on the left side is represented by (k=0), while l is a vertical address of the block, and the first block on the upper side is represented by (l=0). A block next on the right side to the block(k, l) is (k, l+1), and a block next on the lower side to the block(k, l) is (k, l+1). M is the number of horizontal pixels in a block, and N is the number of vertical pixels in the block.

(6) Obtaining a Block Distortion Standard in Consideration of the Variation(Ruggedness) of Brightness A small error is neglected at a portion having a large variation f brightness by human being eyes.

When the variation of brightness is large, a block distortion amount is sensed to be smaller than an actual value. Considering this tendency, it is found that the following equations(11a) to (11c) and (12a) to (12c) are appropriate to provide block distortion standards more proximate to the visual sensation characteristic of human beings.

$$\hat{q}_h(k,l) = \frac{q_h(k,l)}{\sigma^2(k,l)} \quad (11a)$$

$$(1 \leq \sigma^2(k,l) \leq \sigma^2(k-1,l))$$

$$\hat{q}_h(k,l) = \frac{q_h(k,l)}{\sigma^2(k-1,l)} \quad (11b)$$

$$(1 \leq \sigma^2(k-1,l) \leq \sigma^2(k,l))$$

$$\hat{q}_h(k,l) = q_h(k,l) \quad (11c)$$

$$(\sigma^2(k,l) < 1 \text{ or } \sigma^2(k-1,l) < 1)$$

where k is equal to or more than $1 (k \geq 1)$ and l is equal to or more than $0 (l \geq 0)$ in the equations (11a) to (11c).

$$\hat{q}_{v(k,l)} = \frac{q_v(k,l)}{\sigma^2(k,l)} \quad (12a)$$

$$(1 \leq \sigma^2(k,l) \leq \sigma^2(k,l-1))$$

$$\hat{q}_{v(k,l)} = q_v(k,l) = \frac{q_v(k,l)}{\sigma^2(k,l-1)} \quad (12b)$$

$$(1 \leq \sigma^2(k,l-1) \leq \sigma^2(k,l))$$

$$\hat{q}_{v(k,l)} = q_{v(k,l)} \quad (12c)$$

$$(\sigma^2(k,l) < 1 \text{ or } \sigma^2(k,l-1) < 1)$$

where k is equal to or more than $0 (k \geq 0)$ and l is equal to or more than $1 (l \geq 1)$ in the equations (12a) to (12c).

In the equations (11a) to (11c) and (12a) to (12c), dispersion of brightness is used as parameters representing the configuration of the brightness variation. The dispersion $\sigma^2(k, l)$ of the visual sensation brightness in a block$(k, l)$ of the reproduced image is defined by the following equation(13).

$$\sigma^2(k,l) = \sum_{i=0}^{M-1} \sum_{j=0}^{N-1} [Y(M_{k+i}, N_{l+j}) - p(k,l)]^2 \quad (13)$$

In the equation(13), p(k, l) is a mean value of the visual sensation brightnesses in the block(k, l) in the reproduced image, and is defined by the following equation (14).

$$p(k,l) = \frac{\sum_{i=0}^{M-1} \sum_{j=0}^{N-1} Y(M_{k+i}, N_{l+j})}{MN} \quad (14)$$

Using the dispersion of brightness defined in the equations(13) and (14) as parameters for the variation of the brightness makes a calculation cost low. The precision of a calculation result is sufficiently met for a required level. The block distortion standards obtained by the equations (11a) to (11c) and (12a) to (12c) used in the invention fully considers the visual sensation characteristic of human beings to adequately evaluate the image quality relating to the block distortion. Further, the calculation process becomes easy, because the dispersion of a low cost calculation is used.

In the apparatus as shown in FIG. 1, a quantizatation table 4 is adequately selected by using the block distortion standards represented by the equations (11a) to (11c) and (12a) to (12c), and compression and extension of an image are carried out by the selected quantization table. Consequently, the image compression having high efficiency can be realized.

In the block distortion evaluation method as explained above, the visual sensation of human beings on a brightness stimulus, a voltage characteristic of illumination brightness, the discrimination threshold characteristic on lightness of the visual sensation, etc. are considered, so that a standard for correct image evaluation is obtained to select a compression factor as a compression parameter, dependent on which a quantization table is selected. Consequently, the block distortion is decreased, and the compression and extension of images having a high compression factor is carried out.

In the conventional method, however, the increase of calculation cost occurs to make the process impossible substantially, where a brightness variation parameter is included therein. On the other hand, the dispersion of brightness is used in the invention in place of a theoretically faithful parameter, so that the cost of calculation is decreased, and a calculated value has a small error. Consequently, a correct evaluation standard is obtained in the invention.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for compressing and extending a video image signal by orthogonally transforming and encoding the image, said video image signals formed by image blocks of pixels, said images having a brightness and distribution of brightness which may vary from image to image, said apparatus comprising:

means for non-linearly compressing said video image signals by a compression factor including stored data which is determined as a result of an image evaluation proportional to human visual sensation responsive to a stimulus of brightness, said brightness stimulus including said visual response to a distribution of said brightness;

means for transforming an original image signal to provide transformed image by using DCT;

means for providing a block distortion standard at a boundary between image blocks;

means for correcting said compression factor in accordance with said block distortion standard;

means for quantizing said transformed image signal to provide a quantized image in response to using said store data which is in the form of a quantization table storing said compression factor, said data stored in said quantization table being proportional to said human visual sensation responsive to a stimulus of brightness; and means for encoding said quantized image signal to provide an encoded image signal in response using an encoding table;

means for extending said compressed image comprising:

means for decoding said encoded image signal to provide said quantized image signal in response to using an encoding table;

means for inversely quantizing said quantized image signal to provide said transformed image in response to using said quantization table; and means for inversely transforming said quantized image signal to provide a reproduced image signal in response to using said DCT.

2. A system for transmitting compressed video image signals that may have different distributions of brightness, said system comprising:

a transmission line having a transmitter connected to one end and a receiver connected to the other end;

video signal source means coupled to an input of said transmitter for supplying video image signals thereto, said video image signal comprising blocks of signals each having a predetermined number of pixels;

means for non-linearly compressing said video image signals by a compression factor which is determined as a result of an image evaluation proportional to human visual sensation responsive to a stimulus of brightness, said brightness stimulus including said visual response to a distribution of said brightness;

means for detecting a block distortion error at a boundary between said blocks of said video image signals;

quantization look up table means for storing data in the form of a small number of bits for identifying coefficient components relating to a human visual sensory response to a brightness produced in response to said image signal, said coefficient components depending at least in part upon a dispersion of the brightness in said video image which dispersion and brightness may vary from image to image;

means jointly responsive to said data from said quantization look up table means and to said detected block distortion error for correcting said compressed video image signals; and means for transmitting said compressed and distortion corrected video image signals over said transmission line to said receiver.

3. The system of claim 2 and decoder means in said receiver responsive to receipt of said transmitted signals for decoding said compressed and distortion corrected video signals, means responsive to said quantization look up table means for inversely quantizing said decoded video signals, means for restoring said compressed signals to a form of the original video image signals, and means for reproducing the restored video image signals.

* * * * *